US010119088B2

(12) United States Patent
Brusletto et al.

(10) Patent No.: US 10,119,088 B2
(45) Date of Patent: Nov. 6, 2018

(54) METHOD OF PRODUCING CARBON-ENRICHED BIOMASS MATERIAL

(71) Applicant: Arbaflame Technology AS, Matrand (NO)

(72) Inventors: Rune Brusletto, Matrand (NO); Mike Kleinert, Mainz (DE)

(73) Assignee: Arbaflame Technology AS, Matrand (NO)

( * ) Notice: Subject to any disclaimer, the term of this patent is extended or adjusted under 35 U.S.C. 154(b) by 276 days.

(21) Appl. No.: 14/766,189

(22) PCT Filed: Feb. 5, 2014

(86) PCT No.: PCT/EP2014/052222
§ 371 (c)(1),
(2) Date: Aug. 6, 2015

(87) PCT Pub. No.: WO2014/122163
PCT Pub. Date: Aug. 14, 2014

(65) Prior Publication Data
US 2015/0376530 A1 Dec. 31, 2015

(30) Foreign Application Priority Data

Feb. 7, 2013 (EP) ..................................... 13154462

(51) Int. Cl.
*C10L 5/44* (2006.01)
*F23G 5/027* (2006.01)
*C10L 9/08* (2006.01)
*C10L 9/06* (2006.01)

(52) U.S. Cl.
CPC ............. *C10L 5/447* (2013.01); *C10L 9/06* (2013.01); *C10L 9/083* (2013.01); *F23G 5/027* (2013.01); *C10L 2200/0469* (2013.01); *C10L 2230/10* (2013.01); *C10L 2230/14* (2013.01); *C10L 2230/22* (2013.01); *C10L 2290/02* (2013.01); *C10L 2290/06* (2013.01); *C10L 2290/08* (2013.01); *C10L 2290/148* (2013.01); *Y02E 50/10* (2013.01); *Y02E 50/15* (2013.01); *Y02E 50/30* (2013.01)

(58) Field of Classification Search
CPC . F23D 1/005; C10L 5/447; C10L 5/08; C10L 9/06; C10L 9/08; C10L 5/363; C10L 9/083; C10L 2290/02; C10L 2290/08; C10L 2290/30; C10L 2230/14; C10L 2230/10; C10L 2290/148; F23G 5/027; F23G 5/0273; F23G 5/0276; Y02E 50/10; Y02E 50/30; Y02E 50/15
USPC ........................................................ 110/347
See application file for complete search history.

(56) References Cited

U.S. PATENT DOCUMENTS

| 2,704,895 | A | 3/1955 | Cederquist |
| 8,956,426 | B2* | 2/2015 | Sethi ....................... C10B 49/10 44/550 |
| 2008/0163804 | A1* | 7/2008 | Hauk ...................... F23C 6/047 110/224 |
| 2009/0223119 | A1 | 9/2009 | Brusletto et al. |
| 2012/0023813 | A1 | 2/2012 | Sethi et al. |
| 2012/0125064 | A1* | 5/2012 | Joseph ....................... C05C 9/02 71/27 |
| 2013/0105295 | A1* | 5/2013 | Eyer ....................... C10L 9/083 202/99 |

FOREIGN PATENT DOCUMENTS

| CN | 1332780 A | 1/2002 |
| CN | 102 206 928 A | 10/2011 |
| CN | 102245748 A | 11/2011 |
| EP | 1 857 532 A1 | 11/2007 |
| EP | 2 385 096 A2 | 11/2011 |
| WO | 00/031213 A1 | 6/2000 |
| WO | 2009127727 A1 | 10/2009 |
| WO | 2010/071440 A1 | 6/2010 |
| WO | 2012158118 A1 | 11/2012 |
| WO | 2013003615 | 1/2013 |

OTHER PUBLICATIONS

International Search Report and Written Opinion cited in PCT/EP2014/052222 dated Apr. 16, 2014, 8 pgs.
Glasner et al.: "Hydrothermale Carbonisierung: Ein Ueberlick; Hydrothermal Carbonization: A Review", Chemie Ingenieur Technik, vol. 83, No. 11, 2011, pp. 1932-1943.
Bergman et al.: "Torrefaction for biomass upgrading", Proceedings of the 14th European Biomass Conference, Oct. 17-21, 2005.
Arias et al.: "Influence of torrefaction on the grindability and reactivity of woody biomass", Fuel Processing Technology, vol. 89, No. 2, 2008, pp. 169-175.
Chornet et al.: "Phenomenological kinetics and reaction engineering aspects of steam/aqueous tretments", Steam Explosion Techniques, Focher, Marzetti, Crescenzi (eds.), 1991, vol. 72, pp. 196-200.
Bentsson et al.: "Evaluation of hydrocarbon emissions from heart- and sapwood of Scots pine using a laboratory-scale wood drier", Holzforschung, vol. 58, No. 6, 2005, pp. 660-665.

(Continued)

*Primary Examiner* — David J Laux
(74) *Attorney, Agent, or Firm* — Rothwell, Figg, Ernst & Manbeck, P.C.

(57) ABSTRACT

The present invention provides a carbon-enriched biomass material, a method of producing the carbon-enriched biomass material, and a method for using the carbons-enriched biomass material. A lignocellulosic material is used as a starting material and is treated at elevated temperatures under partially oxidizing conditions in a reaction vessel which is isolated from the environment. The carbon enriched biomass can be used in domestic or industrial combustion processes.

28 Claims, 1 Drawing Sheet

(56) References Cited

OTHER PUBLICATIONS

Svoboda et al.: "Integration of biomass drying with combustion/gasification technologies and minimization of emissions of organic compounds", Chemical Papers, vol. 63, No. 1, 2009, pp. 15-25.
Otwell et al.: "HAPs Release from Wood Drying", Environmental Science & Technology, vol. 34, No. 11, 2000, pp. 2280-2283.
Milota: "Emissions from wood drying; The Science and the Issues", Forest Products Journal, vol. 50, No. 6, 2000, pp. 10-20.
Faix et al.: "Thermal degradation prodcuts of wood", Holz als Roh- und Werkstoff, vol. 49, No. 5, 1991, pp. 213-219.
Svedberg et al.: "Emission of Hexanal and Carbon Monoxide from Storage of Wood Pellets, a Potential Occupational and Domestic Health Hazard", Ann. occup. Hyg., vol. 48, No. 4, 2004, pp. 339-349.
Samuelsson et al.: "Sampling and GC-MS as a method for analysis of volatile organic compounds (VOC) emitted during oven drying of biomass materials", Biomass and Bioenergy, vol. 30, 2006, pp. 923-928.
Granstroem: "Emissions of volatile organic compounds from wood", PhD thesis Karlstad University, 2005.
Risholm-Sundman et al.: "Emissions of acetic acid and other volatile organic compounds from different species of solid wood", Holz als Roh- und Werkstoff, vol. 56, 1998, pp. 125-129.
Prins et al.: "Torrefaction of wood Part 2. Analysis of products", J. Anal. Appl. Pyrolysis, vol. 77, 2006, pp. 35-40.
Parikh et al.: "A correlation for calculating HHV from proximate analysis of solid fuels", Fuel, vol. 84, 2005, pp. 487-494.
Kleinert et al.: "Carbonisation of biomass using a hydrothermal approach: State-of-the-art and recent developments", Proceedings of the 17th European Biomass Conference, Hamburg, Jun. 29 to Jul. 3, 2009, pp. 1683-1687.
Huber et al.: "Synthesis of Transportation Fuels from Biomass: Chemistry, Catalysts, and Engineering", Chemical Reviews, vol. 106, No. 9, 2006, pp. 4044-4098.
Corma et al.: "Chemical Routes for the Transformation of Biomass into Chemicals", Chem. Rev., vol. 107, 2007, pp. 2411-2502.
Titirici et al.: "Back in the black: hydrothermal carbonization of plant material as an efficient chemical process to treat the $CO_2$ problem?", New Journal of Chemistry, vol. 31, 2007, pp. 787-789.
Pandey et al.: "Lignin Depolymeri-zation and Conversion: A Review of Thermochemical Methods", Chemical Engineering & Technology, vol. 34, No. 1, 2011, pp. 29-41.
Neubauer: "Nutzung von Biomasse zur Energiegewinnung; Usage of Biomass for Energetic Conversion", Chemie Ingenieur Technik, vol. 83, No. 11, 2011, pp. 1880-1889.
Cocchi et al.: "Global Wood Pellet Industry Market and Trade Study", IEA Bioenergy, Task 40, 2011, http://www.bioenergytrade.org/ downloads/t40-global-wood-pelet- market-study_final.pdf.
Extended European search report dated Apr. 25, 2013.
International Preliminary Report on Patentability dated Aug. 11, 2015.
Wikipedia excerpt: "Headspace technology", retreived online on Dec. 16, 2015.
TU Clausthal: "Brennstoffanalyse", 2010, pp. 10-11.
Anonymous: "Torrefied Wood", Jun. 25, 2012, XP055253177, retreived from the internet: https://web.archive.org/web/20120625225545/http://newbiomass.com/ our-products/torrefied-wood on Feb. 25, 2016.

* cited by examiner

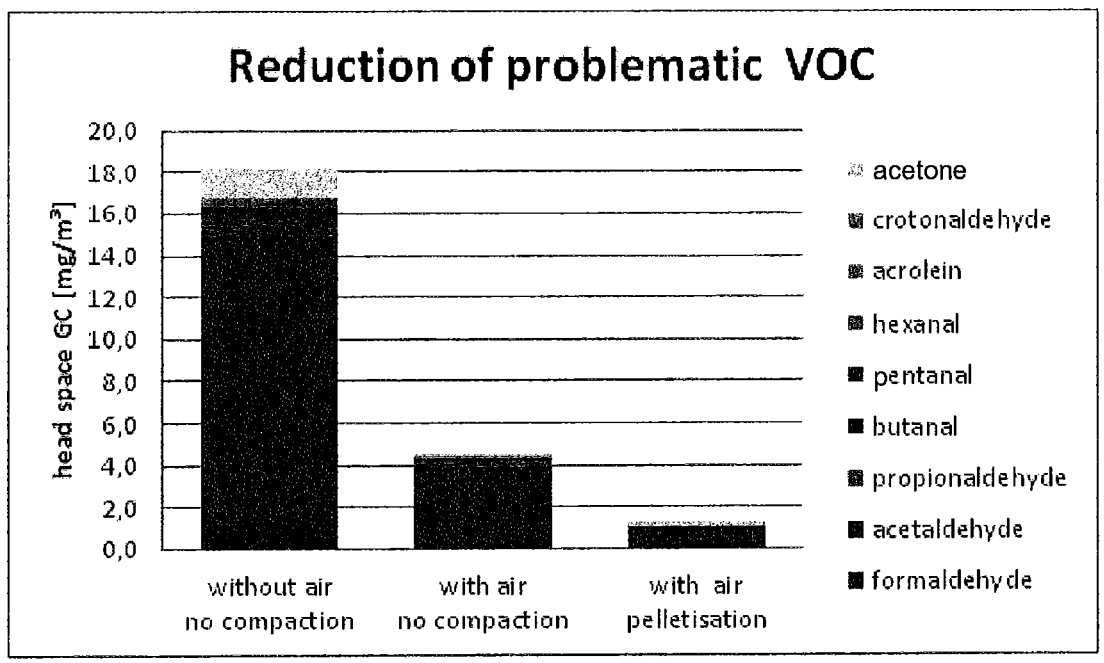

METHOD OF PRODUCING CARBON-ENRICHED BIOMASS MATERIAL

CROSS REFERENCE TO RELATED APPLICATION

This application is a 35 U.S.C. 371 National Phase Entry Application from PCT/EP2014/052222, filed Feb. 5, 2014, which claims the benefit of European Patent Application No. 13154462.9 filed on Feb. 7, 2013, the disclosures of which are incorporated herein in their entirety by reference.

The present invention refers to a method of producing carbon-enriched biomass material, the carbon-enriched biomass material obtained thereby as well as its use.

The fact that today's fossil carbon-based energy economy has to change due to finite resources and also its impact on the climate change has been widely accepted. Currently, different strategies for renewable energy sources, e.g. wind, solar or biomass, are under investigation and already partly established. When biomass is considered as a source of energy carriers, one has to differentiate between liquid biofuels (biodiesel etc.), mainly for the transport sector, and solid biofuels (biocoal, pellets etc.), predominantly for heat and power applications (Neubauer, *Chemie Ing. Technik* 2011, 83, 1880-1889). For the case of solid biofuels, untreated wood pellets, so-called "white pellets", were introduced into the (domestic) market some years ago, which was excellently reviewed by the International Energy Agency (Maurizio et al., IEA Bioenergy, Task 40, November 2011). Hence, the required legal and regulatory measures, such as classification and industry norms, were taken to make the fuel and the combustion units compatible, but also the respective production lines and infrastructure.

Well-known limitations and intrinsic shortcomings of today's commercially available white pellets from wood can particularly be seen in their emission behavior and their general property profile:

1. during storage and self-induced heating, carbon monoxide is formed.
2. other volatile organic compounds (VOCs) are released, which is problematic in view of health, safety and environment (HSE) issues.
3. poor mechanical strength and form stability of white pellets cause handling difficulties. For example, dust residues are formed by abrasion causing the risk of dust explosion etc. particularly during storage and shipping.
4. white pellets are highly sensitive towards moist and humidity, leading to swelling and/or disintegration. Accordingly, storage and transport is complicated.
5. white pellets have a low bulk density of about 550-650 kg/m$^3$. The "lower heating value" (LHV) of white pellets (LHV=16-18 MJ/kg) corresponds to that of untreated non-dried wood. Accordingly, the energy density (LHV per volume) is low.
6. consistency of white pellets including elastic fibers disqualifies for grinding and makes them unusable for large-scale or industrial dust-fired burner applications.

Solutions to some of the mentioned drawbacks are under investigation and essentially three different approaches are being followed in this regard:

steam treatment or steam explosion (SE)
torrefaction (TF), and
hydrothermal carbonization (HTC)

All above-mentioned technologies involve (hydro)thermal treatment to break up the integral structure of natural lignocellulosic biomass, which is made up of cellulose, hemicellulose (HC) and lignin.

In course of this conversion, HC, which chemically is the least stable of the mentioned three major ingredients, is being degraded to a certain extent, depending on the process conditions. HC is predominantly degraded via its monomers, particularly pentose, such as xylan, which immediately further degrades to i.a. harmful compounds. The formation of compounds like aldehydes (formaldehyde, acetaldehyde, hexanal, pentanal, etc.), furan derivatives (5-hydroxymethyl furfural (HMF), furfural (FU), etc.), phenol (derivatives) (guaiacol, syringol, etc.) as well as $C_1$-$C_6$ carboxylic acids (formic acid, acetic acid, etc.) and $C_1$-$C_6$ alcohols (e.g. methanol) are determined upon heating of biomass under pyrolytic conditions. The toxic character of these compounds is well known, partly with distinct negative effects from long-term exposure. Some of these molecules have even found their way onto the U.S. Environmental Protection Agency's (EPA) list of 189 hazardous air pollutants (HAPs), for example methanol, formaldehyde, acetaldehyde, acrylic acid and phenol to name just a few prominent ones. Some of these compounds are also known to further degrade to other, even more health concerning compounds, such as $C_{1-4}$ aldehydes and $C_{1-4}$ carboxylic acids, which make up for the characteristic, obnoxious smell of some thermally treated biomass samples.

All of the above-mentioned technologies (SE, HTC and TF) aim at the physicochemical disintegration of the main wood components to make the product better accessible at an increased energy density, thereby taking into account an overall mass loss.

Torrefaction is usually referred to as a mild form of pyrolysis of biomass as temperatures are typically ranging between 200 and 320° C. Torrefaction is usually carried out under atmospheric pressure and in the absence of oxygen. Torrefaction apparatus' are commercially available, e.g. by Kusters-Zima). During torrefaction, the volatile and flammable gases are burnt to generate some process energy. However, the products still suffer from a distinct odour, even upon storage at ambient temperatures.

Hydrothermal carbonization (HTC) is a technology for converting biomass at elevated temperatures and pressures in the presence of water optionally using an acid catalyst. The presence of oxygen is avoided. The lignite-type products of hydrothermal carbonisation also develop a comparable smell upon storage. In the production process, a large fraction of hazardous substances is generated and mainly remain in the waste water or is released into the air together with the saturated steam. Complex purification of waste water and exhaust gases is required.

Steam explosion technology refers to a steam treatment at elevated temperatures and pressures, wherein after the treatment, the reaction vessel is suddenly depressurized in order to (i) break up (defibrilate) the physical integrity of the polysaccharide-lignin network and (ii) empty the reaction vessel. During steam treatment, the abrupt pressure release yields a large amount of volatile HC degradation products as well as non-condensables. Compared to torrefaction, steam explosion technology is driven at significantly higher water content in the reaction, so that a large amount of the unwanted substances end up in blow-down steam/water. Typically, some of the stinky VOCs are captured in the solid product, which evolve slowly upon storage.

Each of the above-mentioned processes is carried out under the strict exclusion of oxygen to prevent a combustion process (generation of carbon dioxide and heat), which in turn would result in a direct loss of desirable carbon in the end product.

Despite massive research efforts in this field, the disadvantages associated with these technologies, particularly with regard to environmental and economical issues, have not been recognized.

The formation of harmful substances and hence emissions upon production or downstream processing was completely neglected, despite the fact that some of the compounds generated during the (hydro) thermal treatment contribute to severe technical and HSE problems. Besides, the usually occuring unpleasant smell of conventional solid biofuels is also problematic at the end user's storage site.

In view of the above-mentioned drawbacks of the known technologies for producing carbon-enriched biomass material, it is an object of the present invention to provide a method for producing carbon-enriched biomass material having an improved energy balance with reduced generation of—particularly harmful—organic by-products, wherein the material obtained exhibits superior quality.

Surprisingly, it was found that (hydro) thermal treatment of lignocellulosic material under partially oxidizing conditions results in a reduced formation of harmful VOCs and other organic compounds resulting in an unpleasant smell. Moreover, it was found that such prepared products have an improved property profile.

On the other hand, the heat generated by the partial oxidation can directly be used within the reaction vessel, thereby improving the overall energy balance of the reaction.

Thus, in a first aspect, the present invention relates to a method of producing carbon-enriched biomass material comprising the steps of:
(i) providing lignocellulosic material as starting material,
(ii) subjecting said starting material to a treatment at elevated temperature under partially oxidizing conditions in a reaction vessel,
(iii) opening of said reaction vessel, and
(iv) optionally separating solid products from the reaction mixture.

BRIEF DESCRIPTION OF THE DRAWING

FIG. 1 shows the results of a VOC analysis by means of headspace-gas chromatography.

Biomass is biological material from living or recently living organisms, preferably referring to plants or plant-derived materials. The present invention relates to a method of enriching, i.e. increasing, the carbon content (mass of carbon/total mass) of the product as compared to the biomass used as starting material.

As a starting material, a lignocellulosic material is used. Lignocellulosic starting material preferably derives from vascular plants and is particularly lignocellulosic wood material, corn, straw, greenery (e.g. grass, foliage), paper waste, algae or mixtures thereof. In a preferred embodiment, the starting material used in the method according to the present invention is a lignocellulosic wood material, e.g. sawdust and similar. The lignocellulosic starting material used in the present invention may have a rest moisture of about 10-70 wt.-%, preferably 10-45 wt.-% or 30-70 wt.-%, most preferably 10-45 wt.-%. The lignocellulosic starting material is preferably in the form of shredded particles having a size of 0.2-100 mm, preferably 0.5-50 mm, more preferably 0.5-5 mm.

Step (ii) is carried out at elevated temperature, that means at a temperature higher than room temperature (25° C.). In preferred embodiments, the temperature, preferably the maximum temperature, in step (ii) is in the range of from 120 to 320° C., preferably from 150 to 280° C., more preferably from 180 to 250° C. The reaction mixture is preferably heated with a rate of about 10-120° C./min, preferably 10-100° C./min.

The maximum reaction pressure is preferably from 1 to 100 bar absolute pressure, preferably from 1 to 50 bar absolute pressure, more preferably from 1 to 45 bar absolute pressure, most preferably from 2 to 45 bar absolute pressure, wherein 1 bar absolute pressure means atmospheric conditions.

The reaction time is preferably from 2 to 500 min, preferably 2-300 min, more preferably 2-40 min.

Step (ii) is carried out under partially oxidizing conditions. "Partially oxidizing conditions" as used herein refer to the presence of a substoichiometric amount of oxygen with the proviso that complete combustion of the lignocellulosic material, i.e. complete combustion to $CO_2$, requires a stoichiometric amount of oxygen. Step (ii) is preferably carried out in the presence of oxygen, gases comprising oxygen, oxygen donors and mixtures thereof, particularly preferred are oxygen and gases comprising oxygen, such as atmospheric air. Oxygen donors may be compounds which release oxygen ($O_2$) after chemical or thermal treatment, such as peroxides, particularly hydrogen peroxide or aqueous solutions thereof. Preferably, step (ii) is carried out in the presence of oxygen derived from air.

In a preferred embodiment, step (ii) is carried out at a concentration of $O_2$ or $O_2$ equivalents in the range of 0.15-0.45 mol/kg dried lignocellulosic material, preferably in the range of 0.27-0.35 mol/kg dried lignocellulosic material. "$O_2$ equivalent" means the theoretical amount of $O_2$ deriving from $O_2$ donors, e.g. 1 mol $H_2O_2$ corresponds to 1 mol $O_2$ equivalent. This specific adjustment of the oxygen content in the reaction particularly ensures that the volatile organic compounds generated are oxidized without oxidizing further valuable carbon which is to be converted to the end product. Accordingly the process of the invention makes that the undesired by-products, such as VOCs and harmful compounds, are burnt (formation of $CO_2$ and heat which can be used for directly heating the reaction mixture), without sacrificing the yield of carbon-enriched product. This innovative oxidative process management thus leads to an exothermic recalescence allowing for an essentially autothermic regime.

Step (ii) is preferably conducted in a sealed reaction vessel. "Sealed" as used herein means that the vessel is isolated from the environment. By using a sealed reaction vessel, pressure, temperature and oxygen concentration can ideally be adjusted. Step (ii) may be carried out in a reaction vessel which is designed for a batch or a continuous reaction process.

In a preferred embodiment, step (ii) may be carried out in the presence of steam, water and/or gases, particularly inert gases such as nitrogen. Preferably, step (ii) of the method of the present invention is carried out in the presence of steam and/or water, i.e. at hydrothermal conditions. The amount of steam and/or water preferably amounts to 0.1-1.0 kg/kg lignocellulosic material, more preferably 0.2-0.5 kg/kg lignocellulosic material.

Surprisingly, it was found that in case steam and/or water is used in step (ii) (partially oxidizing conditions), the amount of organic compounds in the waste water could significantly be reduced as compared to known hydrothermal (HTC) or steam explosion technologies for producing solid biofuels.

In a preferred embodiment, the amount of steam and/or water preferably amounts to 0.1-0.5, more preferably 0.1-0.2 kg/kg of dry lignocellulosic material. In another embodiment, step (ii) may be carried out in the absence of steam and/or water (except for rest moisture in lignocellulosic material).

According to step (iii), the reaction vessel is opened after the reaction is completed to the desired degree. In case step (ii) has been carried out at elevated pressures (>1 bar), the opening of the reaction vessel is preferably controlled, such that the reaction vessel is depressurized with a rate of 0.01 to 1 bar/s, preferably 0.03 to 0.7 bar/s.

In a preferred embodiment, the reaction vessel is depressurized to a level of about half the level of the operating pressure at a depressurizing rate of 0.01-1 bar/s, preferably 0.03-0.7 bar/s. A further depressurization can then be carried out at any depressurizing rate, in order to open the reaction vessel.

The obtained reaction mixture comprising the carbon-enriched biomass may be a solid or a suspension comprising the carbon-enriched biomass and water (hydrothermal conditions). In the latter case, the solid product is preferably separated by a filter, a cyclone or other conventional fluid-solid separation devices. The obtained solid product may be washed with a liquid medium, such as water or alcohol, preferably water.

In a preferred embodiment, the method according to the invention further comprises a drying step (v), wherein the solid product obtained in step (iv) is dried to a desired residual moisture. Usually, the carbon-enriched biomass may be dried to an extent of less than 20 wt.-%, preferably less than 10 wt.-% of water. The drying step may be conducted at elevated temperatures of e.g. 30-150° C. and/or at reduced pressures of less than 1 bar, preferably less than 300 mbar.

In a preferred embodiment, the solid product obtained in step (iv) or (v) may subsequently be subjected to conventional pelletizing processes, such as extrusion, briquetting or compaction etc. For the pelletizing process further aids, such as lubricants, e.g. waxes, polymers, etc., may be used.

The carbon concentration (kg C/total dried mass) of the solid product obtained in step (iv) or (v) is preferably enriched by 5-25 wt.-%, preferably 8-15 wt.-% as compared to the carbon concentration of the starting material provided in step (i).

In a very preferred embodiment, the present invention refers to a method of producing carbon-enriched biomass material, comprising the steps of:
  (i) providing lignocellulosic material as starting material,
  (ii) subjecting said starting material to a treatment at 160-270° C. under partially oxidizing conditions at pressures in the range from 10-50 bar in the presence of steam in a reaction vessel,
  (iii) opening of said reaction vessel, and
  (iv) separating solid products from the reaction mixture.

In another aspect, the present invention refers to carbon-enriched biomass material obtainable according to the method of the present invention.

The carbon-enriched biomass material preferably has the following elemental composition:
  45 to 60% C, preferably 50 to 55% C,
  5 to 8% H, preferably 5.5 to 6.5% H,
  32 to 50% O, preferably 36 to 42% O, and
  ≤1%, preferably ≤0.5%, of impurities, such as sulfur and nitrogen.

The carbon-enriched biomass material obtainable by the present invention is particularly characterized in that the concentration of harmful VOCs and stinky compounds is reduced by up to 75%, preferably up to 80%, as compared to carbon-enriched biomass material which is prepared at pyrolytic conditions (in the absence of an $O_2$ or $O_2$ donors). Particularly, the total concentration of HMF, FU, aldehydes, phenol and phenol derivatives is less than 20 mg/m$^3$, preferably less than 10 mg/m$^3$.

In a preferred embodiment, the total concentration of aldehydes such as formaldehyde, acetaldehyde, propionaldehyde, butanal, pentanal, hexanal, acrolein, crotonaldehyde, and acetone is less then 20 mg/m$^3$, preferably less than 10 mg/m$^3$, more preferably less than 5 mg/m$^3$, of the non-ground carbon-enriched biomass material. By processing the carbon-enriched biomass material, e.g. by pulverization or pelletization, the VOC content of the above-mentioned compounds may be further reduced to less than 5 mg/m$^3$, preferably less than 2 mg/m$^3$.

The carbon-enriched biomass material obtainable by the present invention particularly has a lower heat value (LHV) of 18 to 22 MJ/kg, more preferably of 18 to 21 MJ/kg.

The carbon-enriched biomass material obtainable by the method according to the invention may be used for preparing pellets. Such pellets may be produced by conventional processes, such as extrusion, optionally using extrusion aids, such as lubricants, e.g. waxes, polymers, etc.

In another aspect, the present invention refers to pellets containing carbon-enriched biomass material obtainable according to the method of the present invention.

In a preferred embodiment, the carbon-enriched biomass material obtainable by a method of the invention or the pellets as described above may be used in combustion processes, particularly in domestic or industrial combustion processes. It has surprisingly been found that the carbon-enriched biomass material or the pellets produced therefrom can easily be ground and are thus particularly suitable for use in dust firing systems, more particularly in large-scale dust firing systems.

All data referring to % as used herein refer to wt.-% unless indicated otherwise.

EXAMPLE

An empty reaction vessel (about 11 m$^3$) was loaded with about 680 kg (dry basis) of ground wood dust mainly deriving from Norway spruce. The reaction vessel was filled to a filling grade of about 50 vol-%. The residual moisture in the wood dust was determined to be about 35% by weight. The particle size of the wood dust was in the range of between 1 and 5 mm.

The reaction vessel was sealed and a pressure of about 4 bar was adjusted with compressed air. The reactor was heated up with 280 kg of steam feeding through nozzles to give a temperature of about 220° C. Under these conditions, the pressure in the reaction vessel is about 22 bar. The reaction mixture was treated for 450 seconds, during which the reaction temperature increased from 220° C. to 225° C. Subsequently, the reaction mixture was sprayed into a blow-down vessel equipped with a cyclone by a sudden pressure release through a tough belt valve (the depressurization step to atmospheric pressure took about 30 seconds, which corresponds to a depressurization rate of about 0.7 bar/s).

The thus obtained steam-gas mixture was collected in a tight vessel for subsequent analysis. The mixture was stored at about 60° C. for 48 hours. Subsequently, a VOC analysis by means of headspace-gas chromatography was carried out. The results of the headspace-gas chromatography showed a total concentration of 4.55 mg/m$^3$ of formaldehyde, acetaldehyde, propionaldehyde, butanal, pentanal, hexanal, acrolein, crotonaldehyde and acetone (see Table 1 and FIG. 1).

For comparative purposes, carbon-enriched biomass was produced under the same test conditions, but in the absence of oxygen. In this case, the amount of the above-mentioned aldehydes and acetone was 18.16 mg/m³ carbon enriched biomass. This result shows that in the process according to the present invention, the VOC content could be reduced by almost 75% compared to conventional products which were produced under non-oxidizing conditions.

TABLE 1

| | Carbon-enriched biomass | | |
| --- | --- | --- | --- |
| | non-oxidizing conditions no compaction | oxidizing conditions no compaction | oxidizing conditions pelletization |
| formaldehyde | 0.870 | 0.250 | 0.190 |
| acetaldehyde | 14.060 | 3.700 | 0.810 |
| propionaldehyde | 0.950 | 0.300 | 0.010 |
| butanal | 0.230 | 0.090 | 0.010 |
| pentanal | 0.140 | 0.010 | 0.010 |
| hexanal | 0.120 | 0.010 | 0.010 |
| acrolein | 0.060 | 0.010 | 0.010 |
| crotonaldehyde | 0.330 | 0.018 | 0.010 |
| acetone | 1.400 | 0.160 | 0.190 |
| Sum (mg/m³) | 18.16 | 4.55 | 1.25 |

The solid product taken from the cyclone was dried to an overall moisture content of 40 wt.-%. Such pre-dried product is then conveyed to a final combined drying and pelletization step machine, during which the moisture content of the product is further decreased. During pelletization of the raw product, the total concentration of aldehydes and acetone could be decreased to 1.25 mg/m³ (see Table 1 and FIG. 1).

The pelletized product was determined to have the following elemental composition:
53.5% C,
39.8% O,
5.9% H,
<0.11% N.

The dried carbon-enriched biomass and particularly the pellets produced therefrom are substantially odorless.

The pre-dried and carbon-enriched biomass as well as the pellets produced therefrom can easily be ground.

The present example shows that the partial presence of oxygen reduces the formation of harmful organic compounds and VOCs in the production process. Particularly the volatile furfural and furan types as well as aldehydes and ketones, such as acetone, which usually cause problems in conventional production processes of solid biofuels, are only formed as intermediates upon dehydration of hemicellulose sugars, but are converted under the oxidizing conditions to carbon dioxide and heat. Accordingly, this innovative oxidative process management leads to an exothermic recalescence allowing for an essentially autothermic regime.

The following items are subject of the present invention:
1. A method of producing carbon-enriched biomass material, comprising the steps of:
   (i) providing lignocellulosic material as starting material,
   (ii) subjecting said starting material to a treatment at elevated temperature under partially oxidizing conditions in a reaction vessel,
   (iii) opening of said reaction vessel, and
   (iv) optionally separating solid products from the reaction mixture.
2. The method according to item 1, wherein the lignocellulosic starting material derives from vascular plants, and is particularly lignocellulosic wood material, corn, straw, greenery (e.g. grass, foliage), paper waste, algae or mixtures thereof, most preferably lignocellulosic wood material.
3. The method according to any of items 1-2, wherein the lignocellulosic starting material has a rest moisture of about 10-70 wt.-%, preferably 10-45 wt.-% or 30-70 wt.-%.
4. The method according to any of items 1-3, wherein step (ii) is carried out at temperatures in the range of from 120° C. to 320° C., preferably from 150° C. to 280° C., more preferably from 180° C. to 250° C.
5. The method according to any of items 1-4, wherein step (ii) is carried out at absolute pressures in the range of from 1 to 100 bar, preferably from 1 to 50 bar, more preferably from 1 to 45 bar, most preferably from 2 to 45 bar.
6. The method according to any of items 1-5, wherein step (ii) is carried out in the presence of oxygen, gases comprising oxygen, oxygen donors or mixtures thereof.
7. The method according to item 6, wherein step (ii) is carried out in the presence of air and/or peroxides, such as hydrogenperoxide or aqueous solutions thereof.
8. The method according to any of items 1-7, wherein step (ii) is carried out at a concentration of $O_2$ or $O_2$ equivalents in the range of 0.15-0.45 mol/kg dried lignocellulosic material, preferably in the range of 0.27-0.35 mol/kg dried lignocellulosic material.
9. The method according to any of items 1-8, wherein the reaction vessel is a batch or continuous reaction vessel.
10. The method according to any of items 1-9, wherein step (ii) is carried out in the presence of steam, water and/or gases.
11. The method according to any of items 1-10, wherein the treatment in step (ii) takes about 2-500 min, preferably 2-300 min, more preferably 2-40 min.
12. The method according to any of items 1-11, wherein the opening of the reaction vessel (step (iii)) is controlled to depressurize the reaction vessel with a rate of 0.01 to 1 bar/s, preferably 0.03 to 0.7 bar/s.
13. The method according to any of items 1-12, wherein the solid product obtained in step (iv) is separated by a filter or a cyclone.
14. The method according to any of items 1-13, wherein the method further comprises a step:
   (v) drying of the solid product obtained in step (iv).
15. The method according to any of items 1-14, wherein the method further comprises a step:
   (vi) pelletizing the solid product obtained in step (iv) or (v).
16. The method according to any of items 1-15, wherein the carbon concentration of the solid products obtained in step (iv) is enriched by 5-25% by weight, preferably 8-15% by weight, as compared to the carbon concentration of the starting material provided in step (i).
17. The method according to any of items 1-16, comprising the steps of:
   (i) providing lignocellulosic material as starting material,
   (ii) subjecting said starting material to a treatment at 160-270° C. under partially oxidizing conditions at pressures in the range from 10-50 bar in the presence of steam in a reaction vessel, (iii) opening of said reaction vessel, and
(iv) separating solid products from the reaction mixture.
18. Carbon-enriched biomass material obtainable according to the method of any of items 1-17.
19. Carbon-enriched biomass material according to item 18, wherein the elemental composition of the product is:
    45 to 60% C, preferably 50 to 55% C,
    5 to 8% H, preferably 5.5 to 6.5% H,
    32 to 50% O, preferably 36 to 42% O, and
    ≤1% of impurities, such as S and N.
20. Carbon-enriched biomass material according to item 18 or 19, wherein the concentration of HMF, FU, aldehydes, phenol and/or phenol derivatives amounts to less than 20 mg/m$^3$, preferably less than 10 mg/m$^3$.
21. Use of carbon-enriched biomass material according to any of items 18-20, for the preparation of pellets.
22. Pellets containing carbon-enriched biomass material according to any of items 18-20.
23. Use of carbon-enriched biomass material according to any of items 18-20 or pellets according to item 22, in combustion processes.
24. Use according to item 23 in dust firing systems.

The invention claimed is:

1. A method of producing carbon-enriched biomass material, comprising the steps of:
   (i) providing lignocellulosic material as starting material,
   (ii) subjecting said starting material to a treatment at temperatures in the range of from 120° C. to 320° C. in the presence of a substoichiometric amount of oxygen at a concentration of $O_2$ or $O_2$ equivalents in the range of 0.15-0.45 mol/kg dried lignocellulosic material in a sealed reaction vessel at absolute pressures in the range of 2 to 100 bar, wherein no gases are removed during the reaction,
   (iii) opening of said reaction vessel, and
   (iv) obtaining carbon-enriched biomass material.

2. The method according to claim 1, wherein the lignocellulosic starting material derives from vascular plants, and wherein the lignocellulosic starting material has a rest moisture of 10-70 wt.-%.

3. The method according to claim 2, wherein the lignocellulosic starting material is selected from the group consisting of lignocellulosic wood material, corn, straw, greenery, paper waste, algae and mixtures thereof.

4. The method of claim 3, wherein the lignocellulosic starting material is greenery and said greenery is grass or foliage.

5. The method of claim 2, wherein the lignocellulosic starting material is lignocellulosic wood material.

6. The method of claim 2, wherein the lignocellulosic starting material has a rest moisture of 10-45 wt.-%.

7. The method of claim 2, wherein the lignocellulosic starting material has a rest moisture of 30-70 wt.-%.

8. The method according to claim 1, wherein step (ii) is carried out in the presence of oxygen, gases comprising oxygen, oxygen donors, or mixtures thereof.

9. The method according to claim 8, wherein step (ii) is carried out in the presence of air and/or a peroxide or aqueous solutions thereof.

10. The method according to claim 9, wherein step (ii) is carried out in the presence of said peroxide and said peroxide is hydrogen peroxide or aqueous solutions thereof.

11. The method according to claim 1, wherein step (ii) is carried out in the presence of steam, water and/or gases.

12. The method according to claim 1,
    wherein
    said starting material is subjected to a treatment at 160-270° C. under partially oxidizing conditions at pressures in the range from 10-50 bar in the presence of steam in said reaction vessel, and said
    solid products are separated from the reaction mixture.

13. The method according to claim 1, wherein the opening of the reaction vessel (step (iii)) is controlled to depressurize the reaction vessel with a rate of 0.01 to 1 bar/s.

14. The method according to claim 13, wherein the opening of the reaction vessel (step (iii)) is controlled to depressurize the reaction vessel with a rate of 0.03 to 0.7 bar/s.

15. The method according to claim 1, wherein the method further comprises:
    (v) separating any solid products from the reaction mixture; and
    (vi) drying any solid product obtained in step (v).

16. The method according to claim 15, wherein the carbon concentration of the solid products obtained in step (v) is enriched by 5-25 wt.-%, as compared to the carbon concentration of the starting material provided in step (i).

17. The method according to claim 16, wherein the carbon concentration of the solid products obtained in step (v) is enriched by 8-15 wt.-%, as compared to the carbon concentration of the starting material provided in step (i).

18. The method according to claim 15, further comprising pelletizing any solid product obtained in step (v) or (vi).

19. The method according to claim 3, wherein step (ii) is carried out at temperatures in the range of from 150° C. to 280° C.

20. The method according to claim 19, wherein step (ii) is carried out at temperatures in the range of from 180° C. to 250° C.

21. The method according to claim 4, wherein step (ii) is carried out at absolute pressures in the range of from 1 to 50 bar.

22. The method according to claim 21, wherein step (ii) is carried out at absolute pressures in the range of from 1 to 45 bar.

23. The method according to claim 6, wherein step (ii) is carried out at the concentration of $O_2$ or $O_2$ equivalents in the range of 0.27-0.35 mol/kg dried lignocellulosic material.

24. A method for combusting a carbon-enriched biomass material, comprising grinding the carbon-enriched biomass material and combusting the material in a dust firing system, wherein said carbon-enriched biomass material is obtainable using a method comprising
    (i) providing lignocellulosic material as starting material,
    (ii) subjecting said starting material to treatment at temperatures in the range of from 120° C. to 320° C. in the presence of a substoichiometric amount of oxygen at a concentration of $O_2$ or $O_2$ equivalents in the range of 0.15-0.45 mol/kg dried lignocellulosic material in a sealed reaction vessel, at absolute pressures in the range of from 2 to 100 bar, wherein no gases are removed during the reaction,
    (iii) opening of said reaction vessel, and
    (iv) obtaining carbon-enriched biomass material wherein the concentration of HMF, FU, aldehydes, phenol and/or phenol derivatives amounts to less than 20 mg/m$^3$.

25. Carbon-enriched biomass material obtainable according to a method comprising the steps of: (i) providing lignocellulosic material as starting material, (ii) subjecting said starting material to a treatment at temperatures in the range of from 120° C. to 320° C. in the presence of a substoichiometric amount of oxygen at a concentration of O2 or O2 equivalents in the range of 0.15-0.45 mol/kg dried lignocellulosic material, in a sealed reaction vessel, at absolute pressures in the range of from 2 to 100 bar wherein no gases are removed during the reaction, (iii) opening of said reaction vessel, and (iv) obtaining carbon-enriched biomass material, wherein the concentration of HMF, FU, aldehydes, phenol and/or phenol derivatives amounts to less than 20 mg/m$^3$.

26. Carbon-enriched biomass material according to claim 25, wherein the elemental composition of the product is:
   45 to 60% C,
   5 to 8% H,
   32 to 50% O, and
   ≤1% of impurities.

27. The carbon-enriched biomass material according to claim 26, wherein the elemental composition of the product is:
   50 to 55% C,
   5.5 to 6.5% H,
   36 to 42% O, and
   said impurities are S and/or N.

28. The carbon-enriched biomass material according to claim 25, wherein said carbon-enriched biomass is in the form of pellets.

* * * * *